(12) United States Patent
Myers et al.

(10) Patent No.: US 8,675,514 B2
(45) Date of Patent: Mar. 18, 2014

(54) DETECTING DEGRADATION OF WIRELESS NETWORK PERFORMANCE

(75) Inventors: Robert J. Myers, Van Buren Township, MI (US); Dalia Poulis, Troy, MI (US); Delano K. Kado, Sterling Heights, MI (US); Kevin R. Krause, Plymouth, MI (US); Fahd Z. Laghrari, Commerce Township, MI (US)

(73) Assignee: General Motors LLC, Detroit, MI (US)

( * ) Notice: Subject to any disclaimer, the term of this patent is extended or adjusted under 35 U.S.C. 154(b) by 579 days.

(21) Appl. No.: 12/833,552

(22) Filed: Jul. 9, 2010

(65) Prior Publication Data

US 2012/0008509 A1    Jan. 12, 2012

(51) Int. Cl.
*G01R 31/08* (2006.01)
*H04J 1/16* (2006.01)
*H04L 1/00* (2006.01)
*H04B 1/034* (2006.01)
*H04M 1/00* (2006.01)

(52) U.S. Cl.
USPC .......... 370/252; 370/242; 455/99; 455/575.9

(58) Field of Classification Search
USPC ............ 370/241, 242, 245, 252; 455/99, 345, 455/575.9
See application file for complete search history.

(56) References Cited

U.S. PATENT DOCUMENTS

| | | | |
|---|---|---|---|
| 6,640,325 B1 * | 10/2003 | Fischer | 714/748 |
| 7,542,428 B1 * | 6/2009 | Johnson et al. | 370/241 |
| 8,116,759 B2 * | 2/2012 | Ying | 455/423 |
| 2003/0107548 A1 * | 6/2003 | Eun et al. | 345/156 |
| 2007/0263833 A1 * | 11/2007 | Zoeckler et al. | 379/221.03 |
| 2008/0269978 A1 * | 10/2008 | Shirole et al. | 701/30 |
| 2008/0304430 A1 * | 12/2008 | Zhuyan | 370/278 |
| 2009/0037034 A1 * | 2/2009 | Mattingly et al. | 701/3 |
| 2009/0063174 A1 * | 3/2009 | Fricke | 705/1 |
| 2009/0227251 A1 * | 9/2009 | Lei et al. | 455/425 |
| 2011/0112720 A1 * | 5/2011 | Keep et al. | 701/36 |
| 2011/0116387 A1 * | 5/2011 | Beeco et al. | 370/242 |
| 2011/0144899 A1 * | 6/2011 | Soelberg | 701/200 |
| 2011/0207502 A1 * | 8/2011 | Topaltzas | 455/550.1 |
| 2011/0219226 A1 * | 9/2011 | Olsson et al. | 713/150 |
| 2012/0004933 A1 * | 1/2012 | Foladare et al. | 705/4 |
| 2012/0039191 A1 * | 2/2012 | Foster et al. | 370/252 |
| 2012/0178376 A1 * | 7/2012 | Jain et al. | 455/67.11 |
| 2012/0254707 A1 * | 10/2012 | Cooke | 714/799 |

* cited by examiner

*Primary Examiner* — Ayaz Sheikh
*Assistant Examiner* — Hoang-Chuong Vu
(74) *Attorney, Agent, or Firm* — Anthony Luke Simon; Reising Ethington P.C.

(57) ABSTRACT

A system and method for monitoring wireless network performance that provides a real-time detection and identification of problem areas within a wireless carrier's network. The method involves receiving and attempting to fulfill requests for vehicle services data sent via the wireless carrier system between vehicles and a call center or other remote facility. The success or failure of these attempts are recorded and associated with the geographic region in which the vehicle was located during the attempt, and this information for a multitude of vehicles is then analyzed in conjunction with other inputs and stored data to determine whether a particular geographic region is experiencing a wireless service outage or other degradation in performance.

18 Claims, 5 Drawing Sheets

DETECTING DEGRADATION OF WIRELESS NETWORK PERFORMANCE

TECHNICAL FIELD

The present invention relates generally to wireless communication and, more particularly, to systems and techniques for monitoring the performance of a wireless communication network.

BACKGROUND OF THE INVENTION

As the number of telematics-equipped vehicles continues to increase, so does the utilization of wireless communication systems to provide telematics services to and from those vehicles. Typically, these services are carried out via one or more wireless carriers' networks; for example, cellular telephone carriers that have interlinked wireless cellular networks using GSM, CDMA or other technology to provide communication over the network between the vehicles and a call center or other remote facility. These networks typically include monitoring equipment and processes that seek to determine base station or other equipment performance problems, such as service outages, so that they can be timely addressed to provide the wireless carrier's customers with reliable cellular service.

Most cellular customers are individuals or business that use the cellular service as a communications means for voice and/or data. In most cases that communication is generally decentralized, making it unsuitable for customer-based monitoring of network performance. Given that the provision of vehicle telematics services involves communication between geographically distributed vehicles and a much more limited number of central facilities, it has become feasible for the telematics services providers, as customers of one or more particular cellular carriers, to perform their own monitoring of the cellular network performance to help improve operation of the network.

SUMMARY OF THE INVENTION

According to one embodiment of the invention, there is provided a method of detecting degradation of wireless network performance in a geographic region. The method includes the steps of: (a) receiving requests for vehicle services data, the requests being associated with different vehicles each capable of wireless telecommunications over a wireless carrier system; (b) attempting wireless communications with the different vehicles via the wireless carrier system to thereby fulfill the requests; (c) for each of at least some of the attempted communications, carrying out the following two steps: (c1) determining a service delivery result indicating whether the requested vehicle services data was successfully delivered via the wireless carrier system; and (c2) obtaining geographic data that is associated with the wireless carrier system and that is indicative of a geographic region in which the vehicle was situated during the attempted communication; and (d) determining, for a particular geographic region, a degradation in performance of the wireless carrier system based on a plurality of the service delivery results that are associated with that particular geographic region.

According to another embodiment of the invention, there is provided a method detecting degradation of wireless network performance. The method includes the steps of: (a) carrying out the following steps for each of a plurality of different vehicles: (a1) commanding the vehicle over a voice channel of a wireless carrier system to obtain vehicle services data from a data services center; (a2) attempting communication from the vehicle to the data services center, including establishment of a packetized data connection between the vehicle and data services center and transmission of the vehicle services data between the data services center and the vehicle over the packetized data connection; (a3) determining at the vehicle whether the attempted communication between the vehicle and data services center was successful; and (a4) for at least some of the plurality of the different vehicles, transmitting from the vehicle a notification concerning the determination; and (b) determining a degradation in performance of the wireless carrier system using the notifications.

In accordance with yet another embodiment of the invention, there is provided a method of monitoring wireless network performance in a geographic region. The method includes the steps of: obtaining individual communication performance data for each of a plurality of vehicles indicative of the wireless communication performance of a wireless carrier system used for calls between the vehicle and one or more remote facilities; determining a geographic region associated with each of the obtained individual communication performance data; for each of at least some of the determined geographic regions, analyzing a plurality of the obtained individual communication performance data associated with that geographic region; and outputting an alert when the analysis indicates at least a partial wireless carrier service outage in one of the determined geographic regions.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below can be used by a telematics services provided or other party to monitor wireless communication network performance and detect when a degradation in performance occurs. This includes detecting both outages as well as more minor reductions in performance. By leveraging existing telematics services that are delivered to a multitude of geographically distributed vehicles, the system and method described below enables real-time detection of network performance problems. In at least one embodiment, the method involves centralized monitoring of the number of successful and failed telematics data delivery attempts, and combines that information with geographic information for the vehicles involved to provide real-time detection of outages and other performance problems within specific geographic areas. This information can be used to alert the affected wireless carrier(s) of the network problem and permits real-time mapping of network performance.

Communications System—

Figure 1:
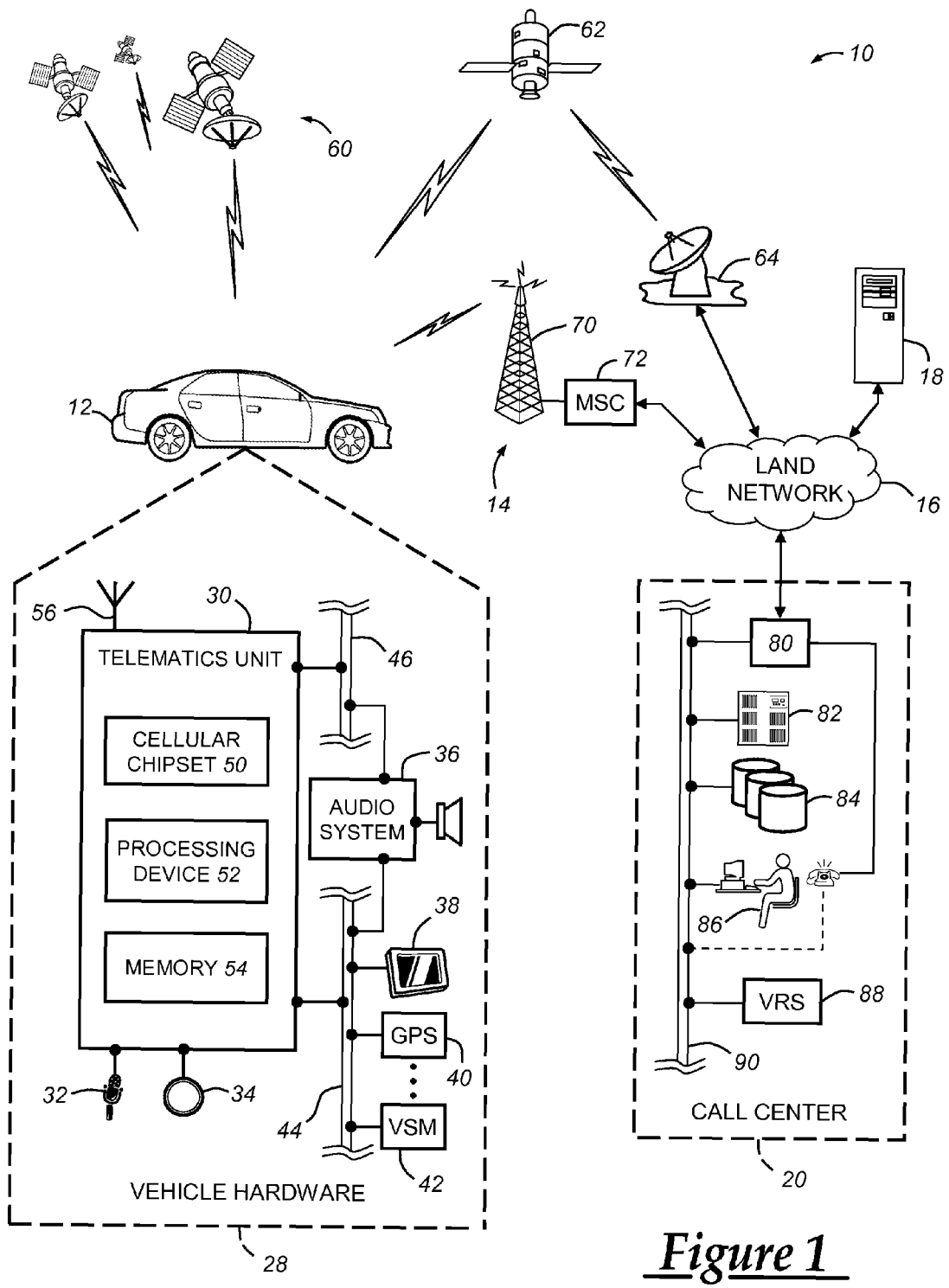
FIG. 1 is a block diagram depicting an exemplary embodiment of a communications system that is capable of utilizing the methods disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1; these include a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. The provision of vehicle services typically involves the transmission of vehicle services data between the vehicle and call center or other remote facility. This vehicle services data may be sent either to or from the vehicle depending on the service being carried out. Examples of vehicle services data includes: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed vehicle services data are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
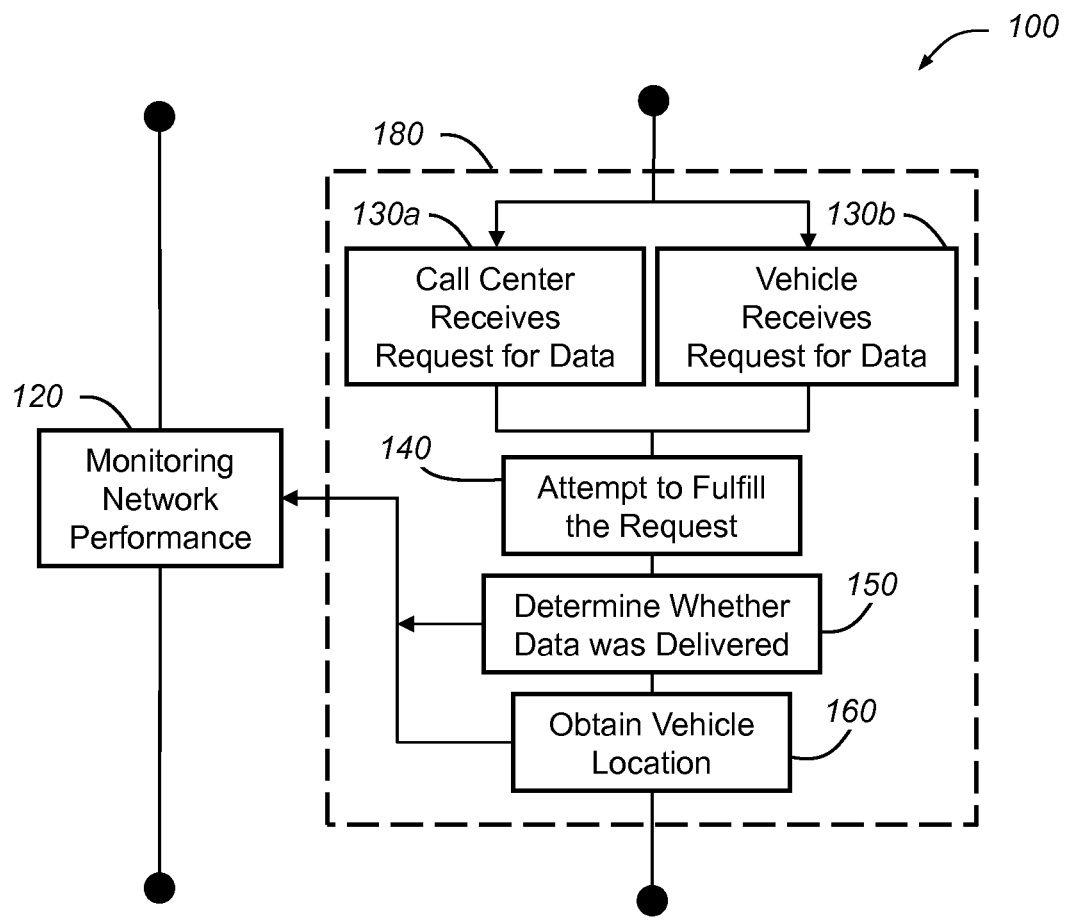
FIG. 2 is a flowchart depicting a method of detecting a degradation of wireless network performance that can be used with the communications system of FIG. 1.

Turning now to FIG. 2, there is shown a flowchart depicting a wireless performance degradation detection method 100 in a wireless communications network. The diagram illustrates two processes that may be carried out sequentially or, as shown, in parallel and partially or completely independently of each other: (1) the monitoring of network performance 120; and (2) a process 180 beginning with one of two events; namely, a vehicle services data request that is made either to a call center 20 (or other remote facility such as computer 18) or to vehicle 12 as indicated in steps 130a and 130b respectively. Generally, the process 180 is carried out as a part of the telematics service provider's normal daily operation in supplying telematics services to a multitude of subscribed vehicles and is used to generate raw data that is continuously collected by the call center 20, with the process 120 being used to continuously analyze the aggregated data for purposes of detecting performance problems with the wireless carrier system 14. This analysis is carried out in real time, as data from the process 180 is continuing to be received and added, such that the process 120 provides real-time detection of outages and other network performance problems. Although in the illustrated embodiment, the process 120 is carried out continuously, in other embodiments it can be done discontinuously (e.g., periodic or sporadic). And, although the illustrated embodiments are described as they could be used in a cellular wireless system, it will be appreciated by those skilled in the art that the methods described herein can be used for other types of wireless communication systems.

Figure 4:
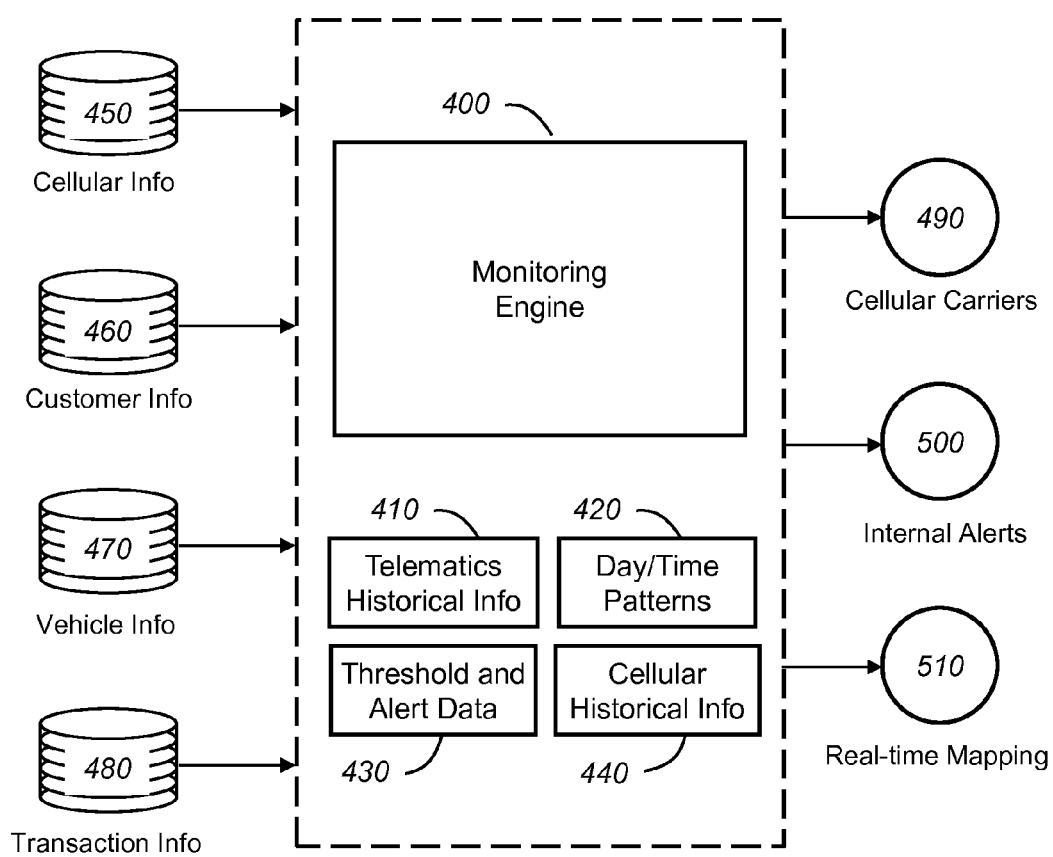
FIG. 4 exemplifies the data received by, utilized by, and outputted by a real-time cellular network performance monitoring system.

The monitoring of network performance by process 120 is further exemplified in FIG. 4 which illustrates a real-time cellular network performance monitoring system or engine 400 that receives information and outputs results while utilizing historical and threshold data to detect a degradation of wireless network performance. Received information can include: cellular information 450, customer information 460, vehicle information 470, and transaction information 480. These inputs are used in conjunction with the various data stored in the network performance monitoring engine 400 to determine outages and/or other network performance degradation. Some examples of data that may be used by the monitoring engine 400 can include: telematics historical information 410, day and time patterns 420, threshold and alert data 430, and cellular historical information 440. Data outputted by the system may include: interfaces to cellular carriers 490, internal alerts 500, and real-time mapping 510.

With respect to the received information, cellular information 450 can include such things as System Identification or SID (a number to identify a cellular network in a certain geographic area, including for example, base stations in CDMA networks), Mobile Dialing Number (MDN), and connectivity status. Customer information 460 can include wireless carrier identification, roaming agreement identification, and information identifying customers having repeated failed telematics services delivery attempts not related to network performance (and thus which can be ignored by process 180). Vehicle information 470 can include GPS latitude/longitude information and may include information concerning the vehicle's installed telematics hardware that impacts communication performance (e.g., different generation transmission equipment such as antennas, chipsets, etc.). Transaction information 480 can be the raw data generated by process 180 in any suitable form. This may primarily include a service delivery result indicating the success or failure of an individual attempted delivery of vehicle services data to or from a vehicle as a part the telematics service provider's normal operations.

Within the monitoring system 400, telematics historical information 410 may includes information such as which type of telematics services have greater failures in delivery. Day and time patterns 420 include information pertaining to periods of lower and higher usage, periods of lower and higher failure rates, etc. Threshold and alert data 430 include information that triggers a warning or notification of a degradation in network performance. These triggers may be fixed or fluctuate based upon information received by the system, various other triggers, etc. Cellular historical information 440 includes information regarding the past performance of various wireless carriers and/or geographic regions.

Using the above inputs and stored data, the monitoring engine 400 carries out the process 120 of analyzing the received transaction data (e.g., the service delivery results reported for each of the attempted deliveries of telematics data services to the vehicles) in an effort to detect any outages or other degradations in network performance. As will be appreciated by those skilled in the art, at least some of the other inputs, as well as the stored data, are used by the monitoring engine 400 in carrying out this analysis. For example, the cellular information 450 can associate SIDs received for each of the vehicle service delivery results (transaction information 480) with the particular geographic region to which each SID is assigned. As another example, vehicle information 470 relating to the equipment performance can be used to weight particular received vehicle deliver results based on the extent to which the performance issue may be at least partially due to the capabilities of the particular equipment used. Also, customer information 460 identifying a particular customer or vehicle that routinely has vehicle services data delivery problems can be used to ignore successful and/or failed delivery reports from that vehicle. Some of the stored data used by the monitoring engine 400 can be used to factor out external effects that impact delivery of vehicle services data. That information may be helpful in determining performance thresholds that are used to decide when performance has degraded and when to issue an associated alert. Since expected network performance can vary based on, for example, day of week and time of day, that information can be used to provide a dynamic threshold that varies with the time and/or day of the week. Historical data relating to the delivery of various telematics services can be used in this way as well; for example, different data services may be supplied by different servers (possibly remotely located from each other), and the use of these different servers may impact the rate of successful delivery of the data to the vehicles. Similarly, historical information concerning the cellular system itself can be used. These various factors affecting the overall delivery of vehicle services data can be taken into account as a part of the analysis carried out by monitoring engine 400 so as to effectively remove the influence of these external factors on the analysis of network performance. The various types of inputs and stored information shown in FIG. 4 and described above are merely exemplary, and their use as well as other types of inputs and data will be known to those skilled in the art.

With respect to outputted information, cellular carrier interfaces 490 can include communications and notifications to wireless carriers regarding the status of the network (e.g., whether an outage or other degradation has occurred). Such interfaces may include notification to a primary cellular carrier and followed by the primary cellular carrier then disseminating the failure to other secondary wireless carriers. Internal alerts 500 can include information pertaining to the mobile vehicle communications system 10 that is not released to wireless carriers. Such information may be used to enhance monitoring techniques such as providing additional information substantiating a network degradation, developing criteria which may be implemented to improve degradation detection, etc. Real-time mapping 510 may include a compilation of successful and/or failed transmissions for each SID or other geographic region that can be used to generate a graphical display of current network performance in one or more geographic areas.

Figure 5:
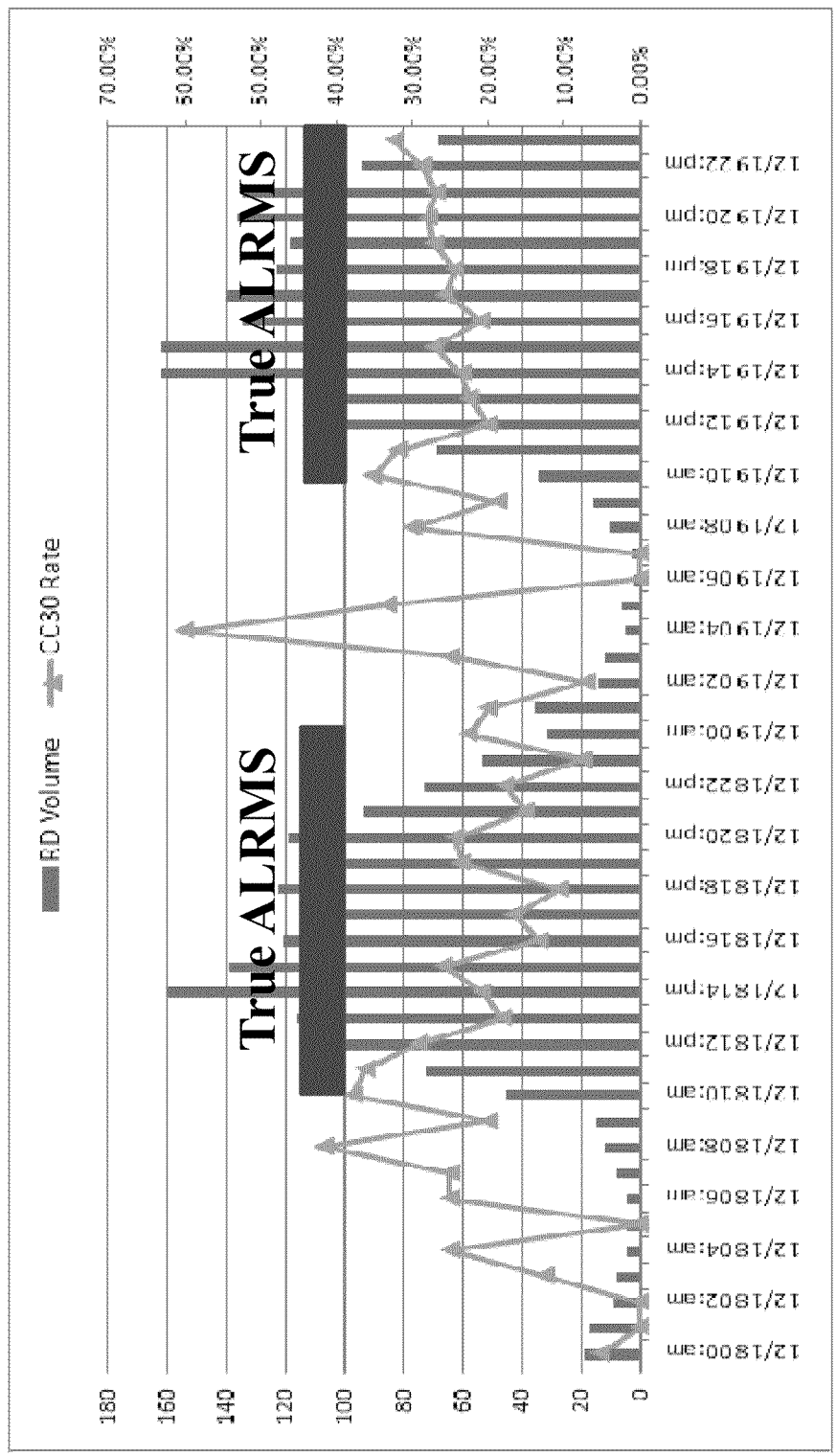
FIG. 5 is a chart of exemplary data showing the relationship between failures, thresholds, and alerts for approximately two 24-hour periods in a given geographic region.

A determination of performance degradation can be done in any suitable manner. For example, it can be based on a percentage of failures relative to a total number of attempts. It can be determined by comparing this percentage to a variable threshold (i.e., one that varies based on the different factors such as time of day, baseline percentage for that geographic region, etc.). Other mathematically representations of the overall performance based on the aggregated service delivery results can be determined as well. Performance degradation can be determined by factoring in other information as well (e.g., based on historical information, cellular carrier-specific information, roaming information, vehicle or telematics attributes such as what telematics unit is used (i.e., what generation of hardware is being used)). Any implementation herein discussed is only exemplary and should not be construed to encompass all potential embodiments of the methods used to determine wireless performance degradation. One example of outputted data from the illustrated method and system is shown in FIG. 5—demonstrating a threshold run in Los Angeles for a period of approximately two days based on navigation route requests from vehicles. The RD (route download) Volume is the summation total of individual service requests (successful and/or failure requests) triggered from a telematics device for a specific geographic region. This count is bucketed into the time of day for the geographic region and sets the baseline for which will determine if there is a network issue occurring. The CC30 (Call Code) Rate shows the percentage of failures occurring in that specific region/area. It demonstrates the number of route download failures detected by the telematics units of the vehicles requesting navigation routes and is communicated to the call center and monitoring database (transaction database 480) for use by the performance monitoring engine 400. The total number of failures is simply divided by the total of route downloads to calculate the CC30 failure percentage rate for that geographic area. The failure rate along with associated data is then used by monitoring engine 400 to determine the severity of the issue and whether to issue an alert. By way of illustration, during peak usage periods of approximately 8 am to 8 pm on both December 18 and December 19, a 40% threshold is used to determine whether there is an outage in the Los Angeles area being monitored. Other thresholds can be used for the offpeak times or monitoring can be discontinued during those times. If the CC30 (failure) rate were to exceed the 40% threshold during the peak hours, an alert would be generated indicating a service outage.

Returning to FIG. 2, the following discussion describes the process 180 for obtaining vehicle delivery results from individual attempts to supply vehicle services data to different vehicles 12 for which telematics services are provided by the call center 20. As used herein, the vehicle services data can be any data or programming used in providing services to the vehicle 12 or to a subscriber associated with the vehicle (e.g., turn by turn instructions sent back to the vehicle, concierge services, diagnostic assistance, emergency services, vehicle locating services, new programming, etc.).

Where call center 20 receives a request for vehicle services data at step 130a (e.g., a vehicle initiated or third party request), the request may derive from human interface with the vehicle 12 (e.g., seeking roadside assistance-related services) or be initiated automatically by the vehicle itself (e.g., diagnostic reporting). Likewise, when a vehicle receives a request for vehicle services data at step 130b (e.g., a call center initiates a request), the request may be human or computer initiated (e.g., emergency assistance, diagnostic reporting, etc.).

Receiving a request for vehicle services data (i.e., either step 130a or 130b) may include a multiplicity of embodiments. It may include receiving a request from a vehicle (in this case, the originating party) via a call to a call center or other remote facility (in this case, the called party) and requesting data from the call center or other remote facility. As used herein, the originator of a particular call is referred to as the originating party, or OP, and the party to which the call is made is referred to as the called party, or CP. The remote facility may be another remote server or device. Receiving a request may also include a request by a vehicle 20 (OP) to permit it to send data to call center 20 or other remote facility (CP). Furthermore, receiving a request for vehicle services data may include a call center or other remote service or device (OP) calling the vehicle (CP) and requesting data be sent back to the call center or to another location. Receiving a request also includes a call center (OP) receiving a request from another process or system at the call center or from another device or location other than the vehicle (CP) (e.g., a request from a diagnostic process at the call center to obtain vehicle diagnostic data from the vehicle, or a request from law enforcement to access the vehicle telematically for tracking or remote stoppage or other services).

Following a request for vehicle services data, an attempt to fulfill the request is made, as indicated at step 140. This attempt may occur by any of a number of different means. For example, the request may be attempted to be fulfilled over the same call in which the request was originally made, or the request may be attempted to be fulfilled over a separate placed call. Where the request is attempted to be fulfilled over the same call, two options are available. E.g., if a vehicle (OP) calls for data, a call center or other remote facility (CP) attempts to send the requested data back during the same call. Or, e.g., if a call center or other remote facility (OP) requests data from the vehicle (CP) over a call, then the vehicle attempts to send the requested data back over the same call.

Where a request is attempted over a separate placed call, multiple implementations are possible. In one exemplary embodiment, a call center (CP) receives a call from a vehicle (OP). The call center (CP) then sends a command to the vehicle (OP) instructing the vehicle to then request the vehicle services data from a server (a new CP). Following the command, the call is terminated. Then, the vehicle (OP) attempts a second data call to a server (new CP). If the call is placed, the server (new CP) attempts to deliver the requested data to the vehicle (OP). This server can be located at the call center, e.g., server 82, or at another location, e.g., computer 18. The data delivered in this manner or in any of the other embodiments can be supplied using any suitable technology; for example, by packetized data transmission over a data connection, or via data modem communication over a voice channel, as will be known by those skilled in the art.

Another implementation involving a separate call might be a call center (OP) calling a vehicle (CP) to request that it retrieve data from the call center (OP) or from another location. The call then ends. The vehicle (as a new OP) now calls back the call center or another location (e.g., a server, device, facility, etc. which is the new CP) and then receives the requested data. Yet another implementation involving a separate call might include a call center or other facility (OP) being commanded by another remote facility instructing it to send data to the vehicle (CP). The reverse is also possible— wherein the remote facility calls the vehicle instructing it to be an originating party (OP) and call the call center or other facility (CP) and send it data.

After an attempt is made at step 140 to deliver the requested vehicle services data, a determination is made as to whether the requested vehicle services data was successfully delivered. This is indicated at step 150. This determination may be accomplished in a number of different ways. In one exemplary embodiment, the request is presumed to be successfully fulfilled unless a failure notification is received from the vehicle over a subsequent call. This presumption may be recorded simultaneous to the request or following a set period of time (e.g., a timeout period). The prescribed timeout period may be a constant or may be variable based upon network conditions and administration. An example of this embodiment is detailed in FIG. 3. Here, the driver contacts a call center over a voice channel requesting information, step 210. Using the voice channel, the call center gives a data instruction to the vehicle commanding it to connect to a server (step 220) from which the vehicle may download the requested information. By default, the call center records a transmission "SUCCESS" in the vehicle's geographic location, as indicated at step 230. Then, at step 240, the vehicle attempts to connect to the server using a data channel. If successful, the process moves to step 260 where the server transmits the requested information to the vehicle. However, if the transmission was not successful, then at step 280 the vehicle connects to the call center again over a voice channel. The vehicle uses this call to report the failure (i.e., to report the service delivery result indicating the failure), as indicated at step 290, and this can be done via a data communication conducted between modems over the voice channel. Based on this received failure notification, the call center at step 300 records a transmission "FAILURE" for the geographic region. Thus, in this embodiment, each delivery of data to the vehicle is deemed to be successful unless and until a failure notification is received by the call center from the vehicle.

Figure 3:
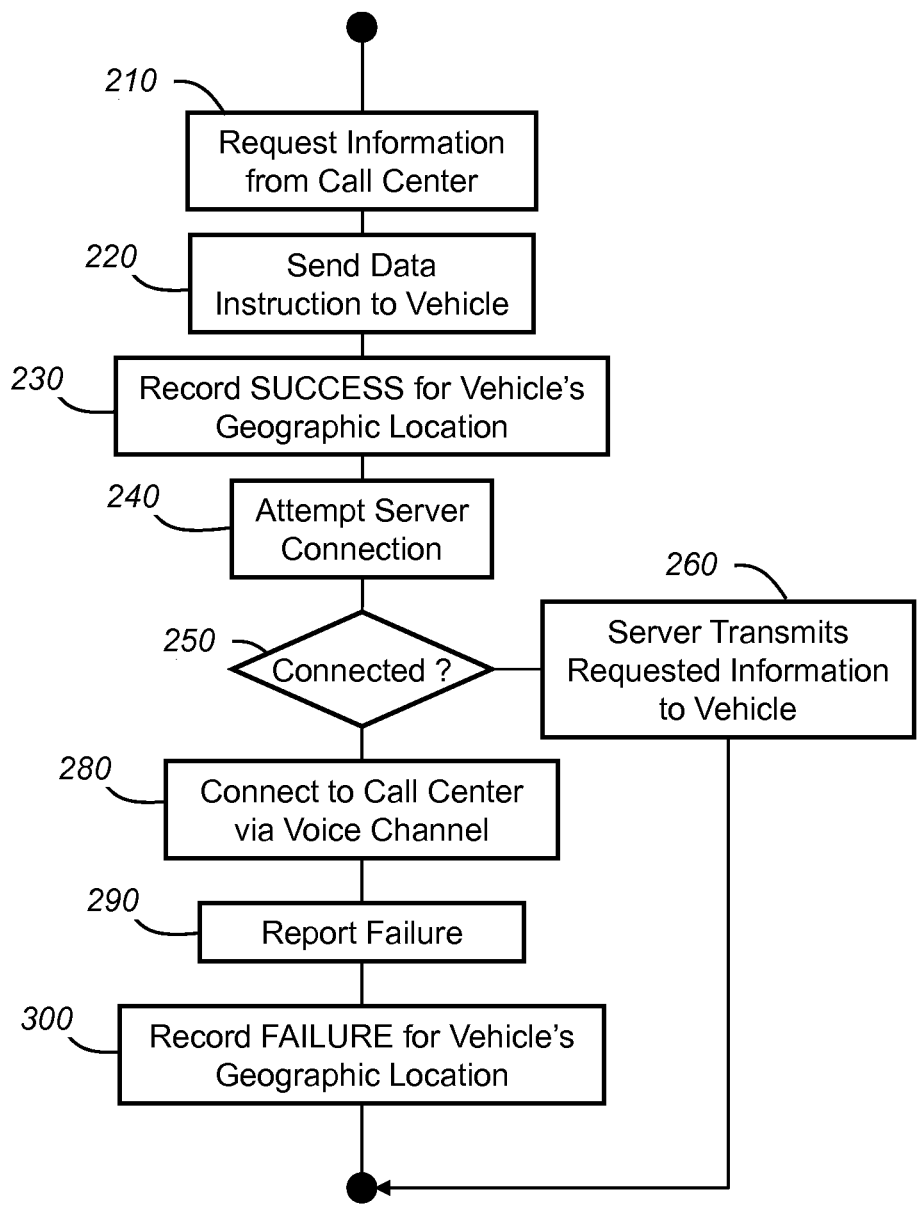
FIG. 3 is a flowchart demonstrating how a failed or successful transmission may be detected within a wireless communications network.

Continuing with FIG. 2, in other embodiments the decision as to whether the vehicle services data was successfully received is determined by the recipient of the requested data (e.g., a call center or a vehicle). In another embodiment, whether the vehicle services data was successfully received is determined by the sender of the requested data. In another embodiment, whether the vehicle services data was successfully received is determined always by the call center or other remote facility regardless of whether the requested data is being transmitted to or from the vehicle. For use by the monitoring engine 400, the success and/or failure of delivery of vehicle services data can be reported using a service delivery result. In the example of FIG. 3 where success is presumed and only failures are specifically reported, this service delivery result can be the failure notification. In other embodiments, it can take the form of each an express SUCCESS notice or express FAILURE notice. In yet other embodiments, it can be an indication of the extent to which the delivery was successful. For example, when the vehicle services data is transmitted via a packet data connection, the data is separated into various individual packets that are received and re-assembled at the receiving end. The process 180 could determine the number of packets unsuccessfully received, or that had to be retransmitted and use that information in generating either a SUCCESS or FAILURE service delivery result or a service delivery result that reports the number of problem packets or the percentage of problem packets or some other such information indicative of the extent to which the data was received without problem. Other such variations will become apparent to those skilled in the art.

In any embodiment, the determination of whether the vehicle services data was successfully received may be recorded in any suitable manner, such as by the use of a counter or any other means which incrementally records successful and failed transmissions. A separate counter can be used for each geographic region being monitored (e.g., for each SID) and these counters can be incremented based on the received service delivery results. This recorded information may then be used by the monitoring engine 400 in real-time or subsequently as a means to determine a degradation in performance of the wireless carrier system.

The final step of the process 180 is obtaining the geographic location of the vehicle 160. Doing so may include obtaining the vehicle's current System Identification (SID) which is used to identify a cellular network in a certain area. The SID for the wireless carrier system may be obtained from the voice call received from the vehicle (either from the voice call originally placed by the vehicle to the call center to request the vehicle services data; or from the data call attempted by the vehicle to the server; or from the subsequent voice call from the vehicle to the call center if a failure is reported). Obtaining the vehicle's geographic location may also include gathering other geographic information (e.g., GPS coordinates of the vehicle or MSC identifier, etc.). As with the service delivery result, this geographic indicator is provided to the monitoring engine 400 so that the associated service delivery result can be processed for the correct geographic region.

As discussed above, once all of this information is received by the monitoring engine 400, it processes it as described above and from that may determine either partial or full outages, or other less significant degradations in performance and associate them with specific geographic regions. This information can then be used for real-time mapping of network performance and to sent alerts to the wireless carriers to help expedite identification and resolution of problem areas.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of detecting degradation of wireless network performance in a geographic region, comprising the steps of:
    receiving requests for content data associated with one or more vehicle services, the requests being associated with different vehicles each configured for wireless telecommunications over a wireless carrier system;
    attempting wireless communications with each of the different vehicles via the wireless carrier system to fulfill the requests;
    for each of at least some of the attempted communications, carrying out the following steps:
       (i) determining a service delivery result indicating whether the requested content data was successfully delivered via the wireless carrier system; and
       (ii) obtaining geographic data that is associated with the wireless carrier system and that is indicative of a geographic region in which the vehicle was situated during the attempted communication; and
    determining, for a particular geographic region, a degradation in performance of the wireless carrier system based on a plurality of the service delivery results that are associated with that particular geographic region.

2. The method of claim 1, wherein the receiving step further comprises receiving the requests via calls placed from each of the vehicles to a call center, and wherein the attempting step further comprises each of the vehicles attempting a subsequent data call to a data services center to receive the requested content data from the data services center.

3. The method of claim 2, wherein the step of determining a service delivery result further comprises determining that the delivery of the requested content data was unsuccessful in response to receipt of a failure notification received via a call from the vehicle, and determining that the delivery was successful if no failure notification is received.

4. The method of claim 3, wherein the obtaining step further comprises obtaining a cellular system ID from one of the calls, wherein the cellular system ID is indicative of the geographic region in which the vehicle is situated.

5. The method of claim 4, wherein the step of determining a degradation in performance of the wireless carrier system further comprises, for the particular geographic region, determining from the service delivery results for a number of the different vehicles a relative amount of determined unsuccessful deliveries of the requested content data relative to a total number of attempted deliveries of the requested content data.

6. The method of claim 1, wherein, for at least one of the different vehicle, the receiving step further comprises receiving a request for content data associated with one or more vehicle services over a call between the vehicle and a remote facility, and the attempting step further comprises attempting to deliver the requested content data over that same call.

7. The method of claim 1, wherein the attempting step further comprises attempting to establish a packet data connection between each of the different vehicles and a server and to supply the requested content data over the established connection.

8. The method of claim 1, wherein the step of determining a service delivery result further comprises determining that an initial delivery of at least some of the requested content data failed, and indicating in the service delivery result the failure of the initial delivery.

9. The method of claim 1, further comprising the step of generating performance data for the particular geographic region using the service delivery results received for a plurality of different vehicles and updating the performance data in real time as new service delivery results are determined.

10. The method of claim 9, wherein the step of determining degradation in performance of the wireless carrier system further comprises determining the degradation in performance by processing the performance data in real time along with one or more other previously-stored cellular performance data items.

11. The method of claim 1, further comprising the step of alerting the wireless carrier system of the determined degradation in performance.

12. A method of detecting degradation of wireless network performance, comprising the steps of:
    (a) carrying out the following steps for each of a plurality of different vehicles:
       (a1) commanding the vehicle over a voice channel of a wireless carrier system to obtain content data associated with one or more vehicle services from a data services center;
       (a2) attempting communication from the vehicle to the data services center, including establishment of a packetized data connection between the vehicle and data services center and transmission of the content data between the data services center and the vehicle over the packetized data connection;
       (a3) determining at the vehicle whether the attempted communication between the vehicle and data services center was successful; and
       (a4) for at least some of the plurality of the different vehicles, transmitting from the vehicle a notification concerning the determination; and (b) determining a degradation in performance of the wireless carrier system using the notifications.

13. The method of claim 12, wherein step (a4) further comprises transmitting the notification if the attempted communication was determined to be unsuccessful and wherein the method further comprises the step of determining that the attempted communication was successful if no notification is received.

14. The method of claim 12, wherein the notification is indicative of the number of packets of data for which transmission of the packets over the packetized data connection at least initially failed.

15. The method of claim 12, wherein steps (a1) and (b) are carried out by a call center.

16. The method of claim 15, wherein the call center is the data services center.

17. The method of claim 12, wherein step (a4) further comprises placing a call from the vehicle to a call center over a voice channel of the wireless carrier system.

18. The method of claim 12, further comprising the step of determining, for at least the vehicles transmitting the notification, a geographic region associated with the location of the vehicle during the attempted communication and wherein step (b) further comprises determining a degradation in performance of a portion the wireless carrier system located in that geographic region using the notifications associated with that geographic region.

* * * * *